(12) United States Patent
Paul

(10) Patent No.: US 8,600,929 B2
(45) Date of Patent: Dec. 3, 2013

(54) METHOD AND COMPUTER SYSTEM FOR AGGREGATING DATA FROM A PLURALITY OF OPERATIONAL DATABASES

(75) Inventor: Chacko Kattithara Paul, Toronto (CA)

(73) Assignee: Trapeze Software Inc., Mississauga (CA)

( * ) Notice: Subject to any disclaimer, the term of this patent is extended or adjusted under 35 U.S.C. 154(b) by 332 days.

(21) Appl. No.: 12/750,296

(22) Filed: Mar. 30, 2010

(65) Prior Publication Data

US 2010/0250566 A1     Sep. 30, 2010

(30) Foreign Application Priority Data

Mar. 31, 2009   (CA) .................................... 2660748

(51) Int. Cl.
*G06F 17/00* (2006.01)
*G06F 7/00* (2006.01)
(52) U.S. Cl.
USPC ............................. 707/600; 707/601; 707/602
(58) Field of Classification Search
None
See application file for complete search history.

(56) References Cited

U.S. PATENT DOCUMENTS

| 5,649,200 | A  | * | 7/1997  | Leblang et al. ............... 717/122 |
| 7,974,942 | B2 | * | 7/2011  | Pomroy et al. ............... 707/610 |
| 2004/0107123 | A1 | * | 6/2004  | Haffner et al. .................... 705/7 |
| 2006/0117075 | A1 | * | 6/2006  | Cowan et al. ................. 707/203 |
| 2008/0208869 | A1 | * | 8/2008  | Van Riel ......................... 707/10 |
| 2009/0172000 | A1 | * | 7/2009  | Lavdas et al. ................. 707/101 |
| 2009/0198805 | A1 | * | 8/2009  | Ben-Shaul et al. ........... 709/222 |
| 2009/0240663 | A1 | * | 9/2009  | Plattner et al. .................... 707/3 |
| 2009/0276449 | A1 | * | 11/2009 | Syed et al. .................... 707/101 |
| 2010/0023542 | A1 | * | 1/2010  | Devanathan et al. ......... 707/101 |

OTHER PUBLICATIONS

Choo, M. H. C. and Spooner, A. "Integration of taxonomic descriptive data across multiple database platforms and softwares (Weed Information Network—a case study)" 2001.*

* cited by examiner

*Primary Examiner* — Angelica Ruiz
(74) *Attorney, Agent, or Firm* — McMillan LLP

(57) ABSTRACT

A method and computer system for aggregating data from a plurality of operational databases are provided. It is determined if a transformation script stored in storage of a computer system has been modified. Delta data extracted from said operational databases and specified by the transformation script is automatically merged and transformed if the transformation script is unmodified. All data extracted from said operational databases and specified by the transformation script is automatically merged and transformed if the transformation script is unmodified.

10 Claims, 8 Drawing Sheets

```
<Request Version="1.0">                    ─── 304
   <Connections>
      <Connection ID="DataSource1" user="" password="" DSN="ClientDataSource"
DbdRefID="DataSourceDbd" MaxThreads="12"/>
      <Connection ID="ConfigSource1" user="" password="" DSN="ClientConfigSource"       ─── 308
DbdRefID="ConfigSource1Dbd" MaxThreads="12"/>
      <Connection ID="DataVault" user="" password="" DSN="ViewPoint_DataVault"
DbdRefID="DataVaultDbd" MaxThreads="12"/>
   </Connections>
   <Dbds>
      <Dbd ID="DataSource1Dbd">C:\Trapeze\MmsData.dbd</Dbd>
      <Dbd ID="ConfigSource1Dbd">C:\Trapeze\MmsCfg.dbd</Dbd>                             ─── 312
      <Dbd ID="DataVaultDbd">..\Schemas\DataVaultTrapeze.db-schema</Dbd>
   </Dbds>
   <Stages>
      <Stage>
         <CommandFiles>
            <CommandFile ID="DataVault">..\Trapeze_V7_x\CommandFiles\FullProcess.xml     ─── 316
               <Group Type="group" ID="DataGroup">
                  <Item>Config</Item>
               </Group>
               <Input>
                  <Variable ID="DBSource" datatype="string">ClientName_config</Variable>
               </Input>
               <ElementMaps>
                  <ElementMap type="Connection" FromRefID="ConfigSource1" ToRefID="Source"/>
                  <ElementMap type="Connection" FromRefID="DataVault" ToRefID="Vault"/>
                  <ElementMap type="Dbd" FromRefID="ConfigSource1Dbd" ToRefID="Source"/>
               </ElementMaps>
            </CommandFile>
         </CommandFiles>
      </Stage>
      <Stage>
         <CommandFiles>
            <CommandFile ID="DataVault">..\Trapeze_V7_x\CommandFiles\FullProcess.xml
               <Group type="group" ID="DataGroup">
                  <Item>COM</Item>
               </Group>
               <Input>
                  <Variable ID=DBSource" datatype="string">ClientName</Variable>
               </Input>
               <ElementMaps>
                  <ElementMap type="Connection" FromRefID="DataSource1" ToRefID="Source"/>
                  <ElementMap type="Connection" FromRefID="DataVault" ToRefID="Vault"/>
                  <ElementMap type="Dbd" FromRefID="DataSource1Dbd" ToRefID="Source"/>
               </ElementMaps>
            </CommandFile>
         </CommandFiles>
      </Stage>
   </Stages>
</Request>
```

Figure 2

```xml
<Commands version="1.0" ObdType="Trapeze" DbdVersion="7.x"
- <Groups>
  - <Group ID="PLAN" type="command">
      <Item>PLAN_Create_Tables</Item>
      <Item>PLAN_Copy_Tables</Item>
      <Item>PLAN_Create_Indexes</Item>
      <Item>PLAN_Process_Info</Item>
    </Group>
  </Groups>
- <Stages>
```

400 — 404

```xml
- <Stage Note="Create Staging Tables">
  - <CommandLists>
    - <CommandList ID="PLAN_Create_Tables">
      - <CreateTable ID="CreateNodes" option="Table" DbdID="Source">
        - <Source ID="CreateNodes" ConnectionID="Vault">
          - <Datas ID="CreateNodes" type="table">
              <Data DBMS="">Nodes</Data>
            </Datas>
          </Source>
        </CreateTable>
      + <CreateTable ID="CreateLineStop" option="Table" DbdID="Source">
      + <CreateTable ID="CreateRidTrips" option="Table" DbdID="Source">
      + <CreateTable ID="CreateRidStopCounts" option="Table" DbdID="Source">
      + <CreateTable ID="CreateStopTimes" option="Table" DbdID="Source">
      </CommandList>
    </CommandLists>
  </Stage>
+ <Stage Note="Set Process Info to created PLAN staging tables">
+ <Stage Note="Copy Data to Staging Tables">
+ <Stage Note="Set Process Info to copied PLAN source data into staging tables">
+ <Stage Note="Create Staging Tables Primary Keys">
+ <Stage Note="Set Process Info to created indexes on PLAN staging tables">
  </Stages>
</Commands>
```

METHOD AND COMPUTER SYSTEM FOR AGGREGATING DATA FROM A PLURALITY OF OPERATIONAL DATABASES

FIELD OF THE INVENTION

The present invention relates to the field of data aggregation and analysis. In particular, it relates to a method and computer system for aggregating data from a plurality of operational databases.

BACKGROUND OF THE INVENTION

One of the issues in any organization is the accumulation of data over time. As an organization develops, records are kept of all data that is deemed important to that organization. Personnel records, sales reports, and client lists are all examples of the myriad of types of data that organizations collect. The advent of computerized databases has greatly facilitated the recording and collecting of data. However, mere collection of data on its own is of little value. The greater value lies in the ability to review the data and subject it to further analysis for performance evaluation and future planning.

This is especially true in the case of operational databases. Operational databases are employed by operational systems to carry out regular operations of an organization that are often transaction-based. In order to better address the needs of a particular application, such databases are built on online transaction processing ("OLTP") models, wherein the efficiency of historical analysis of the data is sacrificed for operational agility.

Given increasing trends towards specialization, it is common for separate areas of an organization (departments, offices, etc.) to maintain their own databases. Thus, for example, a business may have a personnel database maintained by one department, a sales database maintained by another department, an accounting and/or payroll database maintained by a third department, and so forth. As each database is separately maintained, and has a separate purpose, interoperability and data exchange between the separate databases becomes more difficult, at least in part due to differences in data formats. Where at least some of these databases are operational, the challenges faced become greater.

At the upper levels of the business, there is a need for executives and managers to track performance metrics across the entire organization in order to make both short-term and long-term decisions. In order to track these metrics collectively, however, a system and method of integrating data from the multiple operational databases in the organization is needed.

One solution is the use of an extract, transform and load ("ETL") engine to extract the data from the individual operational databases, transform the extracted data into a unified data format, and load the transformed data into a single database for access. While the principles behind the ETL engine are relatively simple to understand, the implementation and execution of ETL engines have proven to be very complex. More often than not, such ETL engines are custom-designed, programmed and compiled to accommodate the individual operational databases and needs of a specific organization. This custom work is both time-consuming and costly, limiting adoption of present ETL engines as a solution. Similarly, when changes are made to the format(s) of any of the operational databases, the source code for the ETL engine must be revised to compensate for changes. Such changes typically require modifications directly to the programming code of the ETL engine, which can be time-consuming and costly, especially where the changes are being made by a party other than the original author/developer, hereinafter referred to as "the developer". As the organization size and the number of individual databases increase, this problem becomes more significant. Once the changes are made, the revised source code must be recompiled before it can be deployed.

There are a number of scenarios where it can be desirable for an organization to obtain access to the source code of such ETL engines. For example, the relationship between the developer of the ETL engine and the organization may sour, perhaps due to the inability of the developer to deliver modifications in a timely manner to the organization in response to changes to the operational databases. The developer may cease operations for any of a number of reasons. Such scenarios generally call for the use of a source code escrow as the developer may not wish to provide direct access to the source code unless the organization absolutely requires it. The use of such a source code escrow adds a layer of additional costs. Further, even if the source code is made available to the organization, they have to secure the services of another developer to customize the source code as required to address the changes to the operational databases maintained by their organization. As will be appreciated, these changes can prove difficult and costly.

Where the requirements of an organization change, the data extracted from the various operational databases generally needs to be re-merged, cleaned and transformed. This process is manually performed as needed, requiring significant knowledge of the tools and the process. The data that needs to be reloaded and the fact data that needs to be removed or updated are manually determined. The result of this manual evaluation is a one-off script to perform the required actions. This manual process is subject to human error and is costly. Further, as this process is typically carried out during off-peak hours, it requires a skilled person to perform the manual rebuilding of the business intelligence data at a less-than-convenient time.

It is therefore an object of the invention to provide a novel computer system and method for aggregating data from a plurality of operational databases.

SUMMARY OF THE INVENTION

In accordance with an aspect of the invention, there is provided a method for aggregating data from a plurality of operational databases, comprising:

determining if a transformation script stored in storage of a computer system has been modified;

automatically merging and transforming delta data extracted from said operational databases and specified by said transformation script if said transformation script is unmodified; and automatically merging and transforming all data extracted from said operational databases and specified by said transformation script if said transformation script is modified.

The determining can include comparing a version number for the transformation script to a registered version number for the transformation script when previously executed.

The determining can include comparing the value of a hash function of the transformation script to a registered value of the hash function for the transformation script when previously executed.

The automatically merging and transforming can be performed during a regularly-scheduled update to a data mart.

In accordance with another aspect of the invention, there is provided a computer system for aggregating data from a plurality of operational databases, comprising:

computer-executable instructions stored in storage of said computer system, said computer-executable instructions, when executed by a processor of said computer system:

determining if a transformation script stored in storage of a computer system has been modified;

automatically merging and transforming delta data extracted from said operational databases and specified by said transformation script if said transformation script is unmodified; and automatically merging and transforming all data extracted from said operational databases and specified by said transformation script if said transformation script is modified.

The determining can include comparing a version number for the transformation script to a registered version number for the transformation script when previously executed.

The determining can include comparing the value of a hash function of the transformation script to a registered value of the hash function for the transformation script when previously executed.

The automatically merging and transforming can be performed during a regularly-scheduled update to a data mart.

Other and further advantages and features of the invention will be apparent to those skilled in the art from the following detailed description thereof, taken in conjunction with the accompanying drawings.

BRIEF DESCRIPTION OF THE DRAWINGS

The invention will now be described in more detail, by way of example only, with reference to the accompanying drawings, in which like numbers refer to like elements, wherein:

FIG. 2 is an exemplary extraction management script used in the system of FIG. 1;

FIG. 3 is an exemplary extraction script used in the system of FIG. 1;

DETAILED DESCRIPTION OF THE PREFERRED EMBODIMENT

Figure 1:
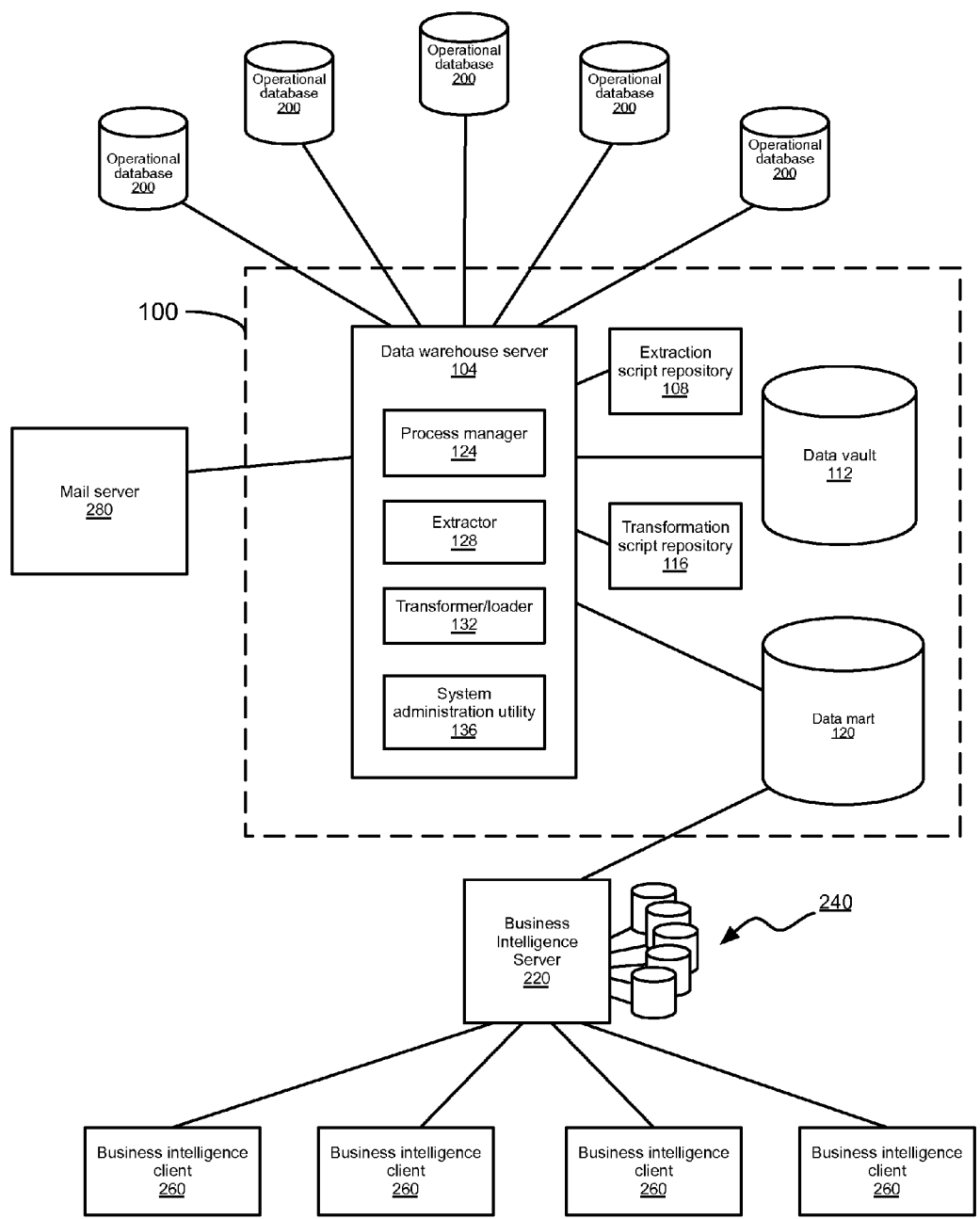
FIG. 1 is a block diagram of a computer system and its operating environment in accordance with an embodiment of the invention.

Many organizations use a number of databases in day-to-day operations. In some cases, some of the databases are operational databases, and in other cases, all of the databases are operational databases. Hereinafter, the term "operational databases" shall refer to a collection of databases, at least some of which are operational databases. Further, the term "operational database", as used herein, shall refer to any database in a set of operational databases.

For example, a public transit organization will have operational databases for vehicle routes and schedules, driver routes and schedules, maintenance, payroll, and customer requests, among others.

Generally, the operational databases used by various organizations are "canned" systems that are hereinafter referred to as "products". These products are purchased and customized to meet the needs of the individual organization, yet the underlying databases generally remain unchanged. That is, the tables and fields of the operational databases, and the relationships between them, remain unchanged during customization.

During the lifetime of such products, they can evolve to meet the changing needs of organizations. These evolutionary steps come in the form of versions of products. While these different versions may be variations of the same product, for ease of description, they will be treated as and referred to hereinafter as different products. As a result, once the "product" upon which an operational database has been determined, the particular data stored, its type and format, and its location are known.

These products can be built on different database management systems, such as Microsoft® SQL Server®, Oracle® 11g and Sybase® IQ.

The present invention provides a system for aggregating data from a plurality of operational databases, and a method for providing the same. The system includes a collection of pre-defined scripts that include configuration information for the system. Some of the scripts correspond to operational database products, and others correspond to operations to be performed on data extracted from the operational databases. The configuration information includes, among other things, text fields and parameters. The text fields identify the name, location and login credentials of various databases, table and field names, etc. The parameters specify whether certain fields and tables will be extracted from the operational databases, and which operations will be performed with the data once it is extracted. In order to configure the system to meet the needs of an organization, a subset of the pre-defined scripts corresponding to the operational database products from which data is to be extracted is selected, along with a subset of the pre-defined scripts corresponding to the operations to be performed on the extracted data, and text fields and parameters in the scripts are modified to customize the scripts.

As many changes, either software or structural, to the operational databases, to the data to be extracted from the operational databases, to the validation checks to be performed on the data, or to the structure of the aggregated data representing the final product, can be addressed by modifying the configuration information contained in the scripts, modifications can be more easily made and checked.

Further, as changes made to the transformation scripts automatically trigger a rebuilding of one or more fact tables, instead of requiring a manual rebuild, changes to the business intelligence requirements generally require significantly less effort to effect. Further, as such rebuilding is automated, it is less prone to errors.

A computer system for aggregating data from a plurality of operational databases in accordance with an embodiment of the invention is shown generally at 100 in FIG. 1. The computer system 100 has a processor, storage in the form of non-volatile storage, such as one or more hard disks, and volatile storage, more commonly referred to as random access memory ("RAM"). The non-volatile storage stores computer-executable instructions for implementing software for aggregating data as will be described below. In addition, the non-volatile storage stores various databases which can be loaded into RAM during execution to accelerate access.

The computer system 100 is in communication with a plurality of operational databases 200 from which data is to be extracted. In order to facilitate the accessing of data stored in the operational databases 200, each operational database 200 includes a database schema file that describes, using a defined standard language, the data tables, the fields of each table and their formats, and the relationships between fields and tables. A business intelligence server 220 is coupled to the computer system 100 for obtaining data that has been extracted from the operational databases 200, validated, cleaned and transformed by the computer system 100. A number of business intelligence clients 240 are in communication with the business intelligence server 220. The business intelligence clients 240 provide a user-friendly interface for presenting various views of the aggregated data to enable business analysis to be performed.

The business intelligence server 220 queries the computer system 100 and, in response, receives one or more OLAP cubes 260 that it uses to provide the various views of the data. The OLAP cubes 260 may be cached by the business intelligence server 220 to be used at a later time in response to a similar query.

A mail server 280 is coupled to the computer system 100 for communicating messages to users of the computer system 100.

The computer system 100 includes a data warehouse server 104 that manages the overall process of data aggregation. The data warehouse server 104 has access to an extraction script repository 108 that is a virtual directory maintained locally by the data warehouse server 104. The extraction script repository 108 houses extraction scripts and an extraction management script that identifies extraction scripts to be executed. Each extraction script corresponds to an operational database product and includes a list of the tables and fields in the operational database product, along with parameters for specifying whether the tables and fields are to be extracted. A data vault 112 for storing data extracted from the operational databases 200 is coupled to the data warehouse server 104. The data vault 112 is a relatively flat database that provides a temporary repository for data extracted from the operational databases 200. Data extracted from the operational databases 200 is stored in its native format in order to reduce the processing required during the extraction of the data and, thus, the amount of time during which the operational databases are tied up. A history of all changes made to the data in the operational databases 200 is recorded in the data vault 112 in a transaction log. The data vault schema is stored in a db-schema file that is initially created and maintained manually with DBEdit.

The data warehouse server 104 also has access to a transformation script repository 116 that houses transformation scripts. Each transformation script corresponds to a fact or dimension and its related data from one or more operational databases 200. The transformation scripts include merge information, transformation information and loading information. The merge information specifies merges to be performed on the data extracted from the operational databases 200 and stored in the data vault 112. The transformation information specifies transformations to be performed on the merged data. The loading information specifies how the merged and transformed data is to be loaded into another data store, as is described below. In addition, the transformation scripts include validation information and cleaning information specifying validation checks and cleaning functions to be performed on the data respectively.

Each transformation script additionally includes a version number. When a transformation script is modified, the version number within the transformation script is updated. Further, the transformation script repository 116 stores a transformation management script and a data mart script. The transformation management script identifies the transformation scripts to be executed. As will be appreciated, some transformation scripts may need to be executed prior to others, as fact tables may rely on data in dimension tables. The data mart script identifies the name, location and login credentials for the data mart 120. Like the extraction script repository 108, the transformation script repository 116 is a virtual directory maintained locally by the data warehouse server 104.

The data warehouse server 104 is also in communication with a data mart 120. The data mart 120 is a multidimensional database to which the data is loaded after merging, validation, cleaning and transformation.

The data warehouse server 104 has a number of software components for performing various functions, including a process manager 124, an extractor 128, a transformer/loader 132 and a system administration utility 136. The process manager 124 is a set of processes that manage and schedule the various functions performed by the extractor 128 and the transformer/loader 132. The extractor 128 is a set of executable programs for connecting to the operational databases 200 and extracting data specified by the extraction scripts in the extraction script repository 108. The transformer/loader 132 consists of structured query language ("SQL") server integration services ("SSIS") that execute the transformation scripts in the transformation script repository 116 to merge the data in the data vault 112 from the various operational databases 200, then validate, clean and transform the merged data prior to loading it into the data mart 120.

The system administration utility 136 provides a web interface for facilitating management of the data aggregation and for the selection and modification of the various scripts from the various pre-defined templates.

The operational databases 200, the computer system 100, the business intelligence server 220, the business intelligence clients 240 and the mail server 280 all reside on a private network that is shared with various people in the organization. As it is desirable to restrict access to the data housed in the operational databases 200, the various databases are access-controlled. The computer system 100 contains the appropriate credentials in order to authenticate with the operational databases 200, the data vault 112 and the data mart 120.

Scripts

The extraction script repository 108 initially contains a pre-defined extraction management script and a collection of pre-defined extraction scripts, each corresponding to a different operational database product. As the operational database products generally don't change during customization of the operational databases 200, the pre-defined extraction script corresponding to the operational database products can be customized via modification of text fields and parameters to address any customizations to the operational databases 200.

The extraction scripts are designed to direct the transfer of data from the operational databases to the data vault 112 using a specific version of a database schema file to the data vault 112. Commands in the extraction scripts are grouped together in many levels of product groups. This permits extraction scripts to isolate "products", or database management system ("DBMS") types, from each other and also provides support for various "staged" data loading strategies. Loading strategies may include: loading entire tables, loading data based on trigger updated log tables and loading data for only a certain number of days. The highest-level groups will be considered a combination of product and loading strategy to the system administration utility 136. The extraction scripts are organized based on the product line, the product, and then the version number of the software product used for the individual operational database.

As changes are made to any of the operational databases 200, or to the data extracted from them, as new operational databases 200 are added or removed, extraction scripts are modified or become inactive. When an extraction script is modified, a duplicate of the extraction script is created and renamed to identify it as a newer version. Similarly, when the extraction management script is modified, it is duplicated and renamed to identify it as a new version.

All the inactive, previously-employed extraction scripts are kept in the extraction script repository 108, so that no extraction script in the extraction script repository 108 is ever changed or deleted. In addition, all prior versions of the extraction management script referring to current and prior versions of the extraction scripts are kept in the extraction script repository 108. Thus, within the computer system 100, for each individual operational database 200, there is a script history and archive of all the scripts used in the past to extract data from that particular operational database 200. Further, there is a complete history of all extraction configurations of the computer system 100 via the combination of the entire set of extraction scripts and extraction management scripts.

FIG. 2 shows an exemplary extraction management script 300. The extraction management script 300 contains not only information for the operational databases 200, but also for the data vault 112. As shown, the extraction management script 300 includes version data 304 to identify its version.

A connections section 308 provides connection information for each database to be connected to. The connection information for each database includes an internal identifier for the database, login credentials consisting of a username and password, the database source name ("DSN") for the database, and the database schema identifier. A database definition file section 312 identifies the location of the database definition files for each database. A staging section 316 specifies extraction scripts to be executed to extract data from the operational databases 200.

FIG. 3 shows an exemplary extraction script 400 that is called by the extraction management script of FIG. 2. Each extraction script 400 is associated with a particular operational database 200 and provides instructions to extract specified data from the operational database 200, create data structures (i.e., tables and fields) in the data vault 112 for storing the specified data if they don't exist, and store the extracted data in the data structures in the data vault 112. As shown, the extraction management script 400 has a routines section 404 and a subroutines section 408. The routines section 404 specifies the general routines to be performed to extract the desired data from a particular operational database 200. The subroutines section 408 defines the subroutines that ensure that the appropriate tables and fields are present or created in the data vault 112, and to actually extract specific data from tables/fields in the operational database 200 to the tables and fields in the data vault 112.

The transformation script repository 116 houses the transformation scripts that are used to merge the data from separate tables in the data vault 112 into tables of the data mart 120, then validate, clean and transform the merged data to generate a multidimensional database. The transformation scripts are SSIS scripts that are called and executed by the transformer/loader 132 on the data warehouse server 104, and use SSIS script packages to perform these tasks.

Each of the tables in the data vault 112 represents data from one of the operational databases 200. Transformation scripts merge data from one or more tables in the data vault 112 related to a fact or dimension. This data is referred to as a fact or dimension table.

Figure 4:
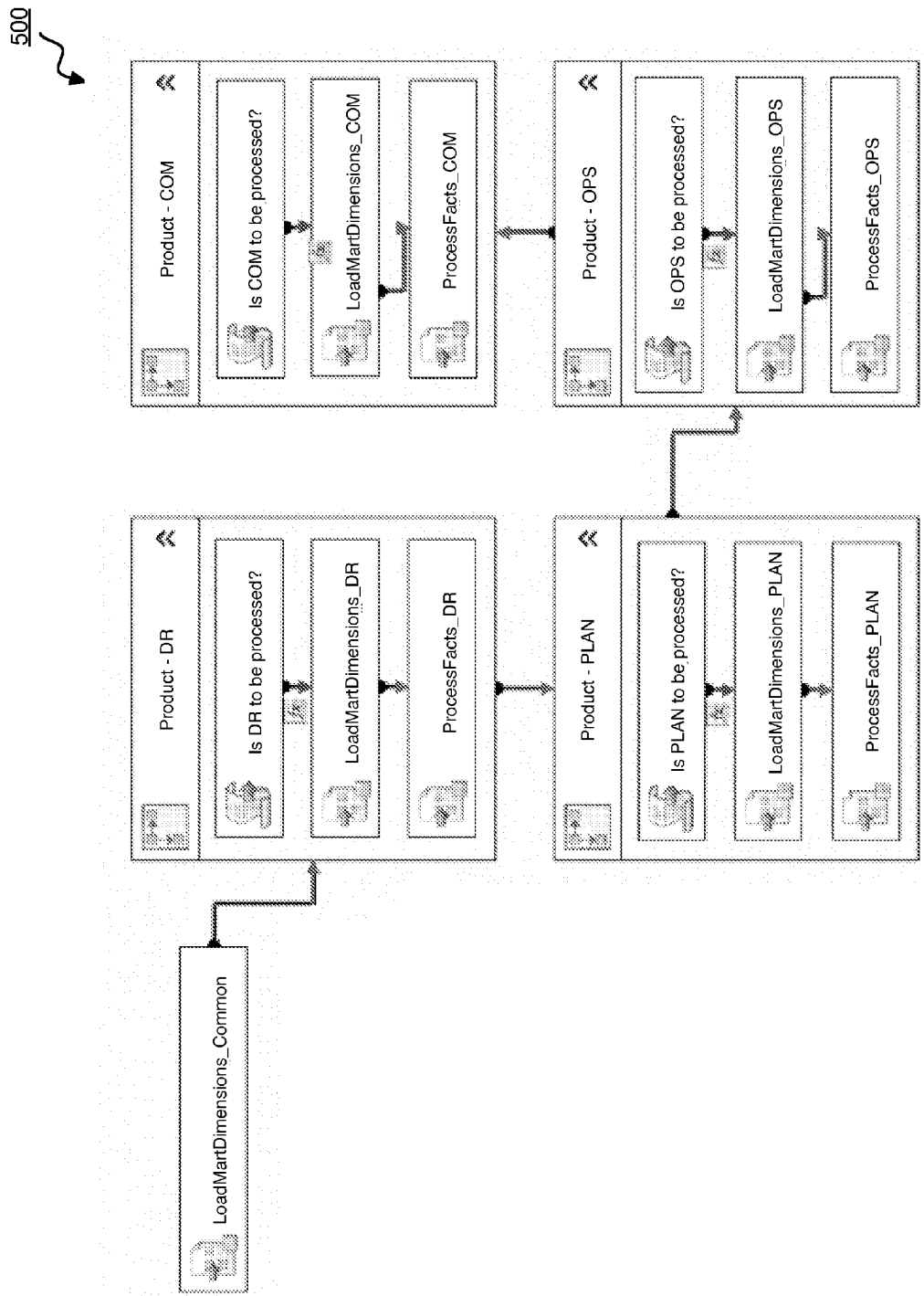
FIG. 4 is an exemplary transformation script used in the system of FIG. 1.

FIG. 4 shows an exemplary transformation script 500. The transformation script is an SSIS script as viewed through Microsoft® Visual Studio®. As shown, the transformation script 500 specifies the various functions to be performed on the data from each operational database 200 that is stored in the data vault 112. These functions include the merging of data from the data vault 112, the validation and cleaning of the merged data, the transformation of the validated data and the loading of the transformed data to the data mart 120. The transformation script 500 is very visual, thus facilitating its modification.

The transformation script 500 specifies that the data from the data vault 112 representing the data from the various operational databases 200 is imported serially when required, so that care can be taken to match up like data from one operational database 200 with the data previously merged from other operational databases 200. Additionally, the transformation script 500 specifies a sequence for the validation and cleaning that is performed on the data. Further, the transformation script 500 specifies the transformation(s) to be performed on the merged, validated and cleaned data, and the operations required to load the transformed data into the data mart 120.

As will be appreciated, the merges, validations and transformations may be modified for a number of reasons. Upon setup of the data warehouse server 104, testing and adjustment is performed to ensure that the data in the data mart 120 accurately reflects the contents of the operational databases 200. If the configuration of one of the operational databases 200 is changed, corresponding adjustments may need to be made to the merges, validations and/or transformations. Where client requirements for the output data change, the transformations may need to be altered. When a transformation script is changed, it is given a new version number. Presently, the version number is coded by the editor of the transformation script, but could also be automatically updated by the data warehouse server 104 when changes are made.

Referring back to FIG. 1, the data mart 120 has an associated data mart schema, which describes the layout of the multidimensional database. Dimension data is contained in dimension, hierarchy and properties tables, while facts are stored in a single fact table per cube. The data mart schema is created manually using DBEdit. New fact tables and changes to dimension hierarchy or properties will not require changes to the data mart, whereas changes to fact tables may require a change in the coding of the computer system 100.

Configuration of the Computer System

The system administration utility 136 provides a web interface for managing configuration of the computer system 100. The system administration utility 136 facilitates specifying the name and location of the operational databases 200, the login credentials required, the location of the data in the operational databases 200 (i.e., table and field name), the versions of the extraction and transformation scripts, and what rules and categories will be used and how they are defined. In this manner, the system administration utility 136 enables modification of the extraction management script, the extraction scripts and the transformation scripts. The system administration utility 136 has a configuration file that stores default parameter values, parameter descriptions, value descriptions and layout options, and allows an authorized user to update the configuration file values, which would allow for custom setups and language translation. The system administration utility 136 permits the execution of any extraction script and can direct the transformer/loader 132 to execute any transformation script. The system administration utility 136 also handles common third-party data integration issues.

The system administration utility 136 presents a list of products to the user for selection. This list of available products is obtained by the system administration utility 136 from the scripts in the product directory. Each script has a list of groups that contain the commands that are a part of the group. The highest-level groups are the product groups. The system administration utility 136 obtains a unique list of these product groups, and presents it to the user for selection.

Figure 5:
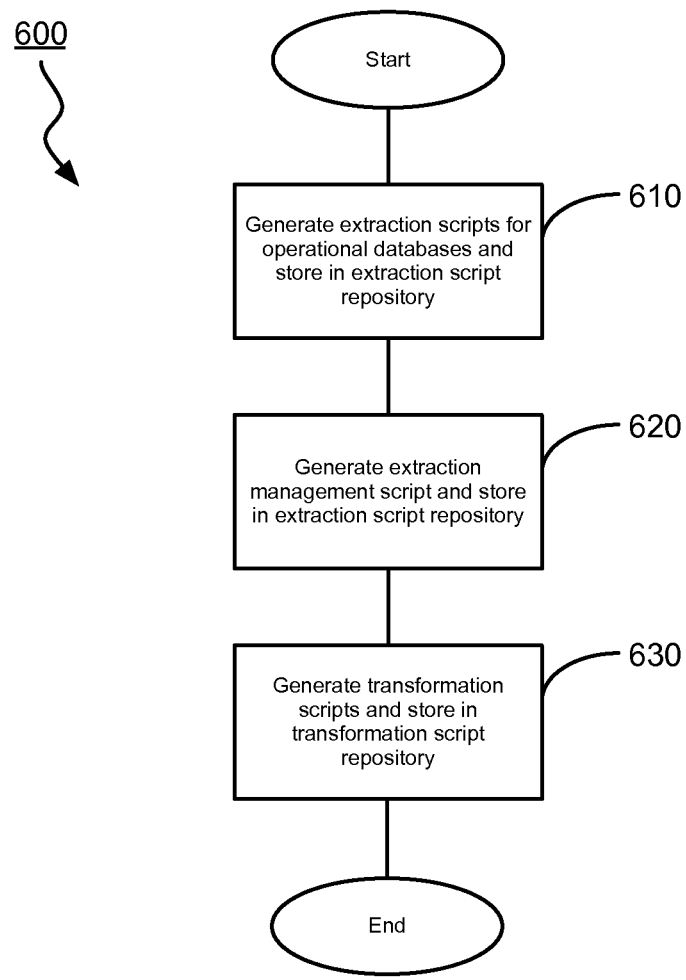
FIG. 5 is a flowchart of the configuration of the computer system of FIG. 1.

FIG. 5 shows the general method of configuring the computer system 100 via customization of the scripts generally at 600. A set of extraction scripts for the operational databases 200 is customized and stored in the extraction script repository (610). There is a one-to-one relationship between the extraction scripts in the extraction script repository 108 and current and past versions of the operational databases 200. The extraction scripts are extensible markup language ("XML") files that are easily read and modified, and provide details regarding the operational database 200 with which they are associated, including the names of tables/fields desired to be extracted, and the version number.

In order to extract data stored in an operational database 200, the extraction script corresponding to the operational database product upon which the operational database is based may need to be modified. In this case, a user interacts with the system administration utility 136 to effect this change. The system administration utility 136 copies the predefined extraction script for the operational database product upon which the particular operational database 200 is based (or an existing extraction script if the operational database has already been added to the computer system 100) and renames it accordingly to identify it as the latest version. Then, the system administration utility 136 provides an interface through which the extraction information contained in the extraction script can be easily modified. Primarily, this is achieved through modification of the text fields and parameters in the extraction script. If, instead, an operational database 200 is removed from service or if data is no longer required from the operational database 200, no extraction scripts are added or deleted from the script database 140.

An extraction management script is generated and stored in the extraction script repository (620). The extraction management script is also an XML file that has a version number and references a list of all the extraction scripts used in conjunction with that version. When changes are made to the extraction scripts or to the address or login credentials of the operational databases 200, the system administration utility 136 copies the current extraction management script and renames it to identify it as the latest version of the extraction management script.

In order to move the operational data for each product out of the operational databases 200 and into the data vault 112, the system administration utility 136 obtains the information required to connect to each operational database 200. For this purpose, the following information is required for each source operational database 200: the database source name ("DSN"), the username and corresponding password, the schema version (product version), and the database definition file ("DBD"). The new operational databases 200 list available DSNs on the server, as well they list available product versions that come from the dbd type and dbd versions information in the scripts. The system administration utility 136 receives this information from the user and registers it in the extraction management script.

For example, when an operational database 200 is added to the computer system 100, the name, location and login credentials are provided by a user via the system administration utility 136 and saved in the extraction management script. If an operational database 200 is removed from the computer system 100, a parameter can be modified to indicate that the corresponding script does not need to be executed or, alternatively, the information for the operational database 200 can be removed from the extraction management script altogether.

The system administration utility 136 also obtains the address and login credentials for the data vault 112 and the data mart 120. In order to move data out of the operational databases and into the computer system 100, an administrator must know where the data vault 112 is located. The following information is required for the data vault 112: the DSN, the username and the corresponding password. The system administration utility 136 prompts the user in a similar manner as when collecting connection information for the operational databases 200 and stores the information in the extraction management script.

Transformation scripts are generated and stored in the transformation script repository (630). A user utilizes the system administration utility 136 to modify default transaction scripts that have been established for a set of default facts and operational databases 200 to set up the computer system 100. Additionally, when changes are made to the operational databases 200, or to the requirements of the business intelligence server 220, a user may need to modify the transformation scripts to accommodate the changes. When the user modifies the transformation scripts, the user increments the version number.

As will be appreciated by those skilled in the art, the collection of all current and prior versions of the extraction management scripts, extraction scripts and transformation scripts enables a return of the computer system 100 to any previous state in order to perform forensic analysis.

Operation of the Computer System

Figure 6:
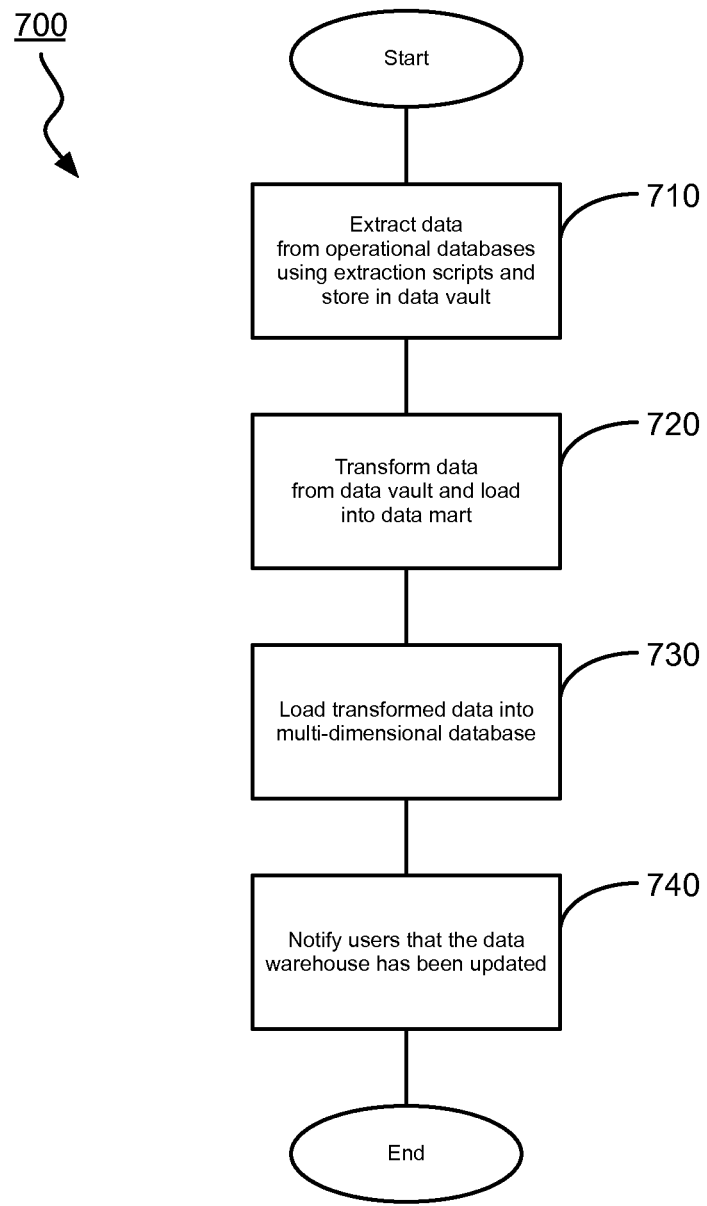
FIG. 6 is a flowchart of the general method of operation of the computer system of FIG. 1.

Operation of the computer system 100 will now be described with reference to FIGS. 1 and 6. In particular, FIG. 6 shows the method of aggregating data using the computer system 100 generally at 700. Typically, this method is executed regularly during a slower period, such as nightly.

Data Extraction

Once the extraction script repository 108 has been populated with the appropriate extraction scripts, data can be extracted from the operational databases 200 using the extraction scripts and extraction management script and stored in the data vault 112 (710).

Figure 7:
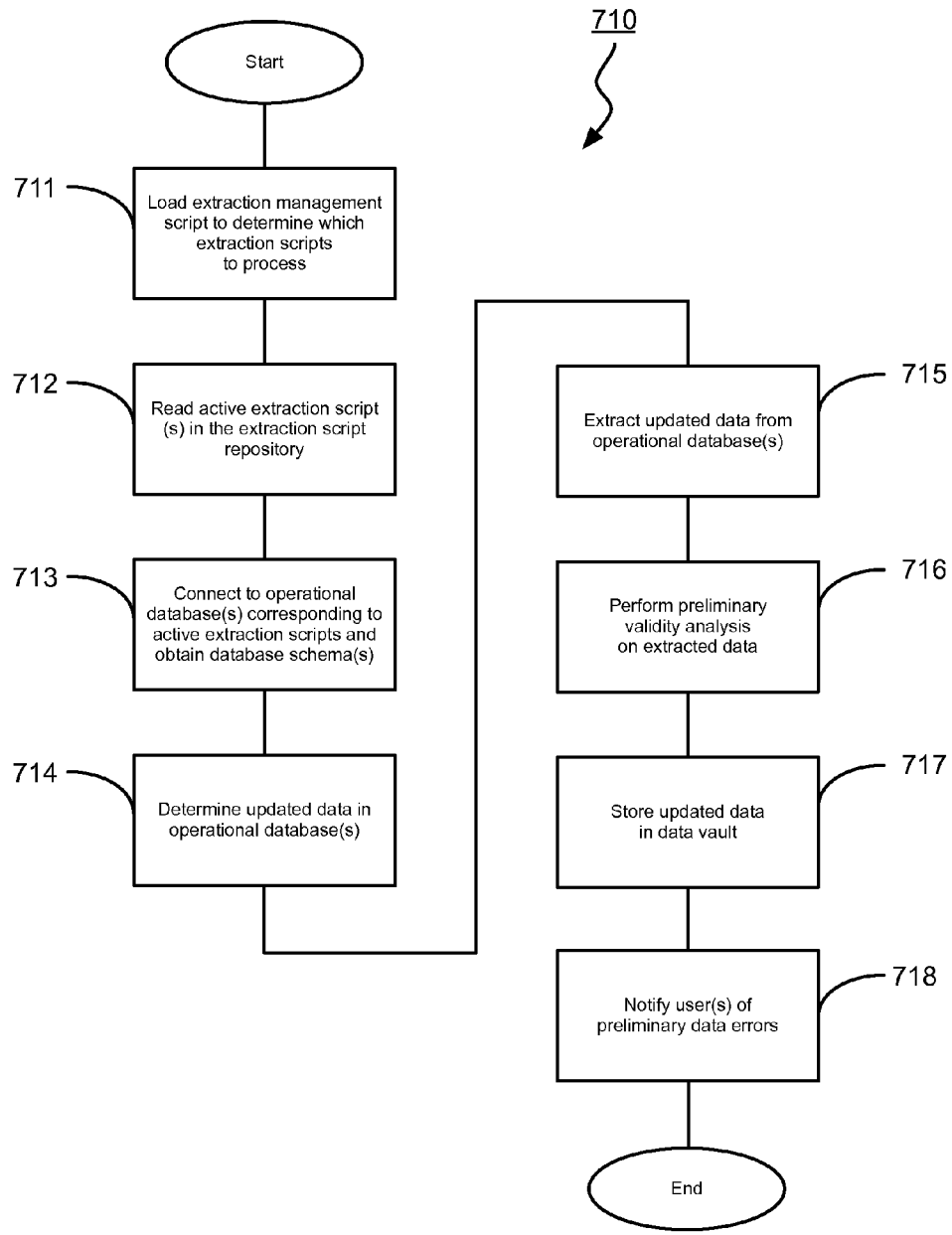
FIG. 7 is a flowchart showing in greater detail the data extraction of the method of FIG. 6.

FIG. 7 better details the extraction and storage of data during 710. The process manager 124 triggers the extraction, merging, transforming and loading process either according to a schedule set through the system administration utility 136 or in response to a manual trigger received by the system administration utility 136. The first task that the process manager 124 performs is the running of the executable files of the extractor 128. The extractor 128 first loads the extraction management script to determine which extraction scripts are to be processed for updates (711).

The extractor 128 then reads the extraction scripts in the extraction script repository 108 identified in the extraction management script (712). Each extraction script indicates what tables/fields are to be extracted from the corresponding operational database 200.

Using the address, knowledge of the DBMS and the login credentials provided in the extraction management script, the extractor 128 then initiates communications with each of the operational databases 200 identified to obtain a copy of the database schema for each operational database 200 (713). As previously indicated, the database schema provides the data tables in the database, the fields of each table and their formats, and the relationships between the fields and tables.

The extractor 128 then determines the updated data identified in the extraction scripts in the operational databases 200 (714). The operational databases 200 provide a list of any data identified in the extraction scripts that has changed since the last extraction. If the data is being extracted for the first time from an operational database 200, then all of the data identified in the extraction script is extracted. Where changes have been made to one or more operational databases 200, or where one or more operational databases 200 have been added, the changes are identified by comparing the extraction scripts to the layout of the data in the operational databases 200, as provided by the database schemas retrieved from the operational databases 200. The appropriate hubs, links and satellite tables are added to the data structures in the data vault 112. Once a field is added to a table in the data vault 112, it is never removed.

The extractor 128 then uses the information contained in the extraction management script and the extraction scripts in conjunction with the information in the various database schema to extract the updated data from the operational databases (715).

A preliminary validity analysis is performed by the extractor 128 on the data being extracted from the operational databases 200 (716). During extraction, if a failure to recognize the data being extracted, or some other extraction error, occurs, the data extraction is stopped for that individual operational database and the error is logged.

The extracted data is then stored in the data vault 112 (717). The extracted data is stored by the extractor 128 in its native format in a relatively large flat database. By reducing the amount of data formatting, validation and transformation at this stage, the extractor 128 is able to interact quickly with the operational databases 200 to extract the data. In this manner, the time period during which the performance of the operational databases 200 is impacted is reduced in length. Once the identified data is extracted from each operational database 200, the extractor 128 disconnects from the operational database 200 in order to allow the operational database 200 to return to full operational agility.

Then, the extractor 128 notifies selected users of the errors detected in the extracted data (718). Users and/or groups of users who are selected to receive these notifications are identified via the system administration utility 136. The notifications are provided to the selected users via email sent by the data extractor 110 via the mail server 280 and indicate that the errors are viewable through the system administration utility 136. Then, the log can be reviewed using the system administration utility 136 to determine if the error arose during the extraction, suggesting that the extraction script for that operational database 200 needs to be updated, or from the database side, which can suggest corruption of the operational database 200.

Data Transformation and Validation

Turning back again to FIG. 6, once the data extraction is complete, the data from the various operational databases 200 in the data vault 112 is merged, validated and transformed in the data mart 120 (720). After the extractor 128 completes the data extraction, the process manager 124 directs the transformer/loader 132 to commence the process of merging, validating, cleaning and transforming the data. As the data vault 112 is separate and removed from the operational databases 200, any operations performed on it do not hinder their performance.

Using the information contained in the transformation scripts, the transformer/loader 132 maps each field and table in the extracted data and converts the data to a corresponding field and table in the data format of the data mart 120. In some cases, fields and tables may be combined, duplicated or created as necessary to comply with the data format used in the data mart 120.

Figure 8:
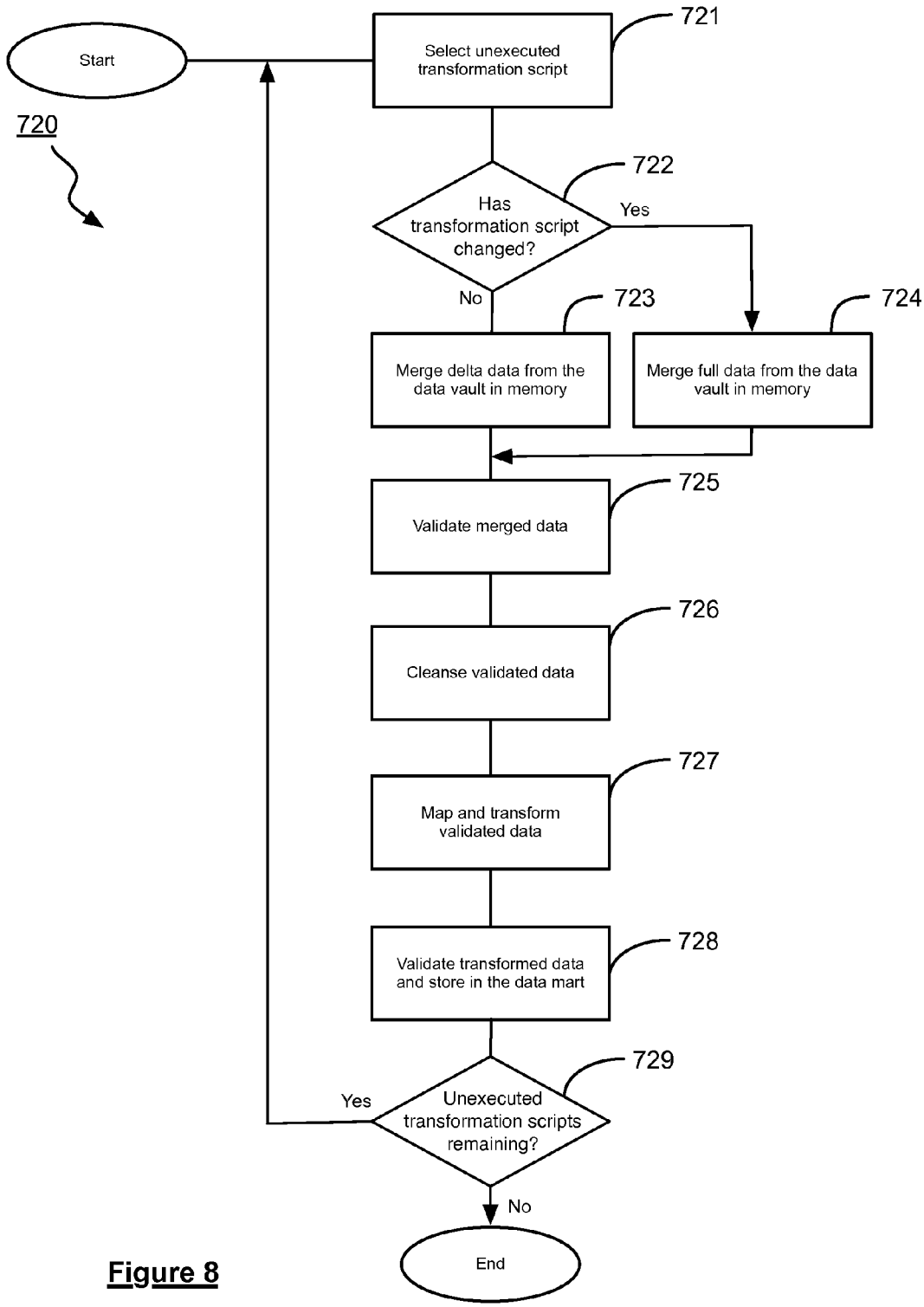
FIG. 8 is a flowchart showing in greater detail the merging, validating, cleaning and transforming of data of the method of FIG. 6.

FIG. 8 shows the steps performed by the transformer/loader 132 during merging, validation, cleaning and transformation of the data. The data transformation process also requires a robust data validation and data cleansing process to ensure that the transformed data corresponds to the original data. Transformation scripts are processed one at a time in an order specified in the transformation management script. As previously noted, each transformation script generates a fact or dimension table.

The transformer/loader 132 selects an unexecuted transformation script (721). The transformer/loader 132 reads the name of a transformation script in the transformation management script to process.

Upon selecting a transformation script, the transformer/loader 132 determines if the transformation script has changed since last run (722). In particular, the transformer/loader 132 compares the version number in the transformation script to the version number of the same transformation script registered when it last ran the transformation script.

If the transformation script has not changed, the transformer/loader 132 merges the delta data from the data vault 112 (723). The transformation scripts specify an order in which the data from the various tables/fields in the data vault 112 is to be imported and merged. The data vault 112 maintains a log of what data has changed when, thus enabling the transformer/loader 132 to merge only data that has changed (i.e., the delta data) since the last time the transformation script was run. The transformer/loader 132 proceeds with the importation and merging of the delta data from the data vault 112 in the memory of the data warehouse server 104.

If, instead, the transformation script has changed, the transformer/loader 132 merges all of the specified data from the data vault 112 (724). The change log maintained by the data vault 112 is ignored. As the data being pulled out of the data vault 112 may be transformed or otherwise modified in some new way, the existing fact tables in the data mart 120 may be inconsistent with the new transformation scripts and are thus discarded, thereby requiring a complete refresh of the particular fact or dimension tables.

Once the data from the data vault 112 is merged, the transformer/loader 132 validates the data, both to capture exceptions (e.g. missing or null values) and obvious data errors (725).

Data that appears on its face to be valid is merged by the transformer/loader 132. Likewise, data that fails validation is also maintained separately and held for review to permit determination of the cause and nature of the error, and to enable correction, where possible.

If the transformation script was determined to not have changed at 722, transformer/loader 132 retrieves only the updated data from the data vault 112, and uses those records to get all records for the data mart table context. That is, if a fact table had a record for metric by each line and the data vault 112 had a change on one trip on that line, the transformation script will retrieve all trips on that line in order to reproduce the record in the fact table. The fact table is updated if the current value has changed and inserted into the fact table if there is no value presently.

The transformer/loader 132 determines if removed records have been archived or deleted based on whether all data for the archiving context has been removed. That is, if an entire day's schedule has been removed, then the transformer/loader 132 treats this as archiving, otherwise it considers it a change and reprocess that data mart context.

The transformation scripts use parameters to determine data categories such as no show codes or overtime pay codes, and use parameters to determine which of many alternate rules to apply in determining each number (i.e. whether or not break time is part of service time). Parameters are defined in the transformation scripts and are unique to a product and section. A section is a subset of parameters that are related and are usually used in a single transformation script.

Ultimately, the parameters are read by the transformer/loader 132, which in turn updates the data mart 120 with values based on the parameters. The transformer/loader 132 then reads the transformation scripts together with the values from the data mart 120 and uses them to control the flow and calculations in the transformation scripts.

Once the fact table is merged in the memory of the data warehouse server 104, the transformer/loader 132 cleanses the validated fact table to correct semantic errors (726). For example, an entry such as 'MAle' for the gender of a person could be changed to 'Male'.

Once the data in the fact table has been validated and cleansed, the transformer/loader 132 performs the actual transformation of the validated data by mapping the fields and values to those defined for the multidimensional database of the data mart 120 (727). Data transformations can apply to both fields and values. For example, one individual database may use the field "Gender" and the values "Male" and "Female", while another individual database uses the field "Sex" and the values "M" and "F". The transformation process needs to convert the fields and values from both individual databases into the same common format, as determine by the multi-dimensional database. The data failing validation at 725 is also transformed into a separate area of the multidimensional database for later review.

After the data has been transformed into a unified format, the transformer/loader 132 reviews and validates the data to verify the integrity of the data and check for any errors that may have arisen (728). Data that fails validation is held for further review in the separate area of the multidimensional database, and either rejected or further reviewed and validated or rejected. As part of the further review process, required changes to the various scripts may be identified via the system administration utility 136 and made to address the issues that resulted in the initial failed validation and/or final rejection of the extracted and transformed data. Upon validation, the data is stored in the data mart 120.

Once the transformer/loader 132 has transformed data in accordance with one transformation script, the transformer/loader 132 determines if there are any unexecuted transformation scripts remaining (729). The transformer/loader 132 refers to the transformation management script to determine if there are any remaining transformation scripts to execute. If there are, the transformer/loader 132 selects the next unexecuted transformation script for processing at 721. If, instead, there are no remaining unexecuted transformation scripts, the method 720 ends.

Data Loading and Storage

Turning back to FIG. 6, once the data has been transformed, it is then loaded into the multidimensional database in the data mart 120 for access by the business intelligence server 220 (730). The transformer/loader 132 loads both the validated and unvalidated data into the data mart 120 according to loading information in the transformation scripts.

The OLAP cube 220 is the end product of the data aggregation process, and contains all the aggregated data from the individual operational databases 200 (after validation and transformation, as described above) in a unified format. The OLAP cube 220 can then be accessed by users via business intelligence applications 220 to review the data and to run data analysis metrics on any desired portion of the aggregated data.

Once the final data validation is performed on the data, the data warehouse server 104 notifies selected users that the OLAP cube 220 has been updated (740).

Data Analysis

Review and analysis of the data in the data mart 120 is provided through the business intelligence clients 260. The business intelligence clients 260 enable users to query the business intelligence server 220 through a private network, or through a public network, such as the Internet. In response, the business intelligence server 220 queries the data mart 120 to obtain OLAP cubes 240 that serve as responses to the queries. Accordingly, security and access restriction mechanisms are provided to prevent unauthorized access to the data in the data mart 120. The business intelligence clients 220 contain tools needed for a user to run data analysis metrics on any combination of data available to the business intelligence server 220 in the data mart 120.

An OLAP cube is a data structure that allows fast analysis of data. The arrangement of data into OLAP cubes overcomes a shortfall of relational databases, in that they are not well-suited for near instantaneous analysis and display of large amounts of data. Instead, relational databases are better suited for creating records from a series of transactions known as on-line transaction processing ("OLTP"). Although many report-writing tools exist for relational databases, these are slow when the whole database must be summarized. OLAP cubes can be thought of as extensions to the two-dimensional array of a spreadsheet. For example a company might wish to analyze some financial data by product, by time-period, by city, by type of revenue and cost, and by comparing actual data with a budget. These additional methods of analyzing the data are known as dimensions. Because there can be more than three dimensions in an OLAP system, the term "hyper-cube" is sometimes used.

Example Application

Public Transit Organization

As an example of the present inventive system and method, a public transit organization is considered herein. Transit organizations contain multiple operational databases, including route schedules, driver schedules, vehicle maintenance orders and records, payroll and other human resources databases, and a variety of customer requests and customer feedback information. These operational databases are generally located in separate departments of the transit organization, and often in separate physical locations.

At the top organizational levels, there is a need for executives and managers to track performance metrics across the entire organization in order to make decisions for both short-term and long-term performance. Additionally, at lower levels, users require access to data to perform their assigned tasks as part of the organization's operations. The present computer system and method facilitates the generation of an aggregate database containing the aggregated data from all of the individual operational databases in the organization.

To begin, extraction scripts are prepared via the system administration utility 136 for each of the transit organization's operational databases to be aggregated. The computer system 100 provides pre-defined extraction scripts to facilitate configuration, reducing the time required to prepare the necessary extraction scripts for the individual operational databases. Likewise, the system administration utility 136 is used to generate the extraction management script and the transformation scripts.

The computer system then runs the initial extraction for the individual operational databases to populate the data mart 120 as described above. This process may take considerable time on the first run, as the full contents of each individual operational database are processed. Accordingly, it can be desirable to schedule this initial extraction during a period of low use. Later runs can be restricted to updated or changed data only in order to minimize the time required for the extraction process.

With the data aggregation process completed, the contents of the individual operational databases are now contained in a unified data format in a single multidimensional database stored in the data mart 120. Users can then access the data stored in the data mart 120 via the business intelligence clients 260 and the business intelligence server 220 to map data and run performance metrics on different combinations of data as required by their assigned task and organizational needs.

As an example, when reviewing Paratransit (transit on-demand) performance, a category such as "On-Time Performance" can be presented generally, or on a per-route basis. Similarly, another category is "Ridership", again, presented as a total, or on a per-route basis. However, with both sets of data brought from their individual operational databases 200 into the data mart 120, on-time performance and ridership can be mapped together, collectively and on a per-route basis, and performance trends more accurately assessed. For example, the combined mapped data may generally show increased ridership with better on-time performance, but also that a decrease in on-time performance occurs as ridership increases beyond a certain point. This point, once identified, can then be used as the mark to increase the allocation of vehicles and routes to continue to sustain the level of on-time performance.

As another example, consider if the maintenance records for the organization show that the number of buses being pulled out of service is increasing. By taking advantage of the data mart 120, a series of metrics can be run to assist in identifying the source of the problem. Vehicle maintenance records can be mapped against operational routes to determine if certain routes lead to vehicles requiring more maintenance. Similarly, maintenance records can be mapped against driver records to determine if some drivers require more maintenance on their vehicles than others. Additionally, the driver route allocation can be mapped against the other results to look for a deeper underlying cause. By running these sets of metrics, the source of the maintenance problem can be readily identified, whether it is a route issue, a driver issue, or a maintenance/parts issue. The issue may even be a combination of these factors that is only apparent when the metrics are combined, such as a particular driver/route combination, and not identifiable from the individual operational databases 200 (maintenance, routes, driver scheduling) alone. Significantly, these metrics can be performed by any person with sufficient access levels to the multi-dimensional database, allowing for more rapid and more specific identification of issues and problems, ideally leading to faster solutions.

Another benefit for the transit organization, particularly an organization like a public transit organization where systems and users are continually being added, removed, and modified over time, is that new systems and users can be easily integrated into the system. Adding data from an additional operational database 200 to the data mart 120 is accomplished by adding the additional extraction script needed for the new operational database 200, modifying the extraction management script to reflect the new extraction script and modifying the transformation scripts to identify how the data from the new operational database 200 is to be combined with the other data, validated, etc. Adding new users to the computer system 100 is a matter of providing the users permission to access the system administration utility 136. Thus, the overall computer system is readily expandable to meet the needs of the transit organization. This is of particular use for those organizations which are also involved in purchases and mergers, as integration of new users and new operational databases 200 arising from the process is readily performed for minimal expenses and effort. Furthermore, if both parties were previously using the computer system 100, integration can be even more rapidly achieved by an exchange of script repositories, enabling the computer system 100 to access the new operational databases 200 with a minimal amount of time and labor.

A potential use for the computer system 100 is in cooperation and coordination between different organizations. While different cities generally operate under different transit organizations, it is also common for individual cities to have multiple transit organization operating in the city, under different transit operations and/or different regional authorities. While it is recognized that cooperation and coordination between different authorities may not be common, the ability to exchange and compare equivalent data using the present invention makes such cooperation and coordination easier to achieve and may result in it becoming more common, to the benefit of both parties.

For example, in a city with different regional transit organizations operating under different regional authorities, cooperation between the regional authorities is facilitated, as data from the each authority's data mart 120, in accordance with the present invention, is in the same format, thus producing performance metrics which are compatible. The parties are then able to readily comprehend each other's metrics, allowing for greater understanding and improved coordination, without the need for the parties to be operating compatible systems at the individual database level, which may not be possible or desirable.

While the above system and method has been presented in the context of a public transit organization, the system and method are equally applicable to any business or organization which incorporates multiple operational databases and requires business intelligence on the aggregated data from all of the operational databases.

The data warehouse server can be a single physical computer or, alternatively, can be two or more computers, either in the same location or situated at remote locations. Correspondingly, the various functions performed by the data warehouse server can be handled by two or more computers.

The data vault, the data mart, and the two script repositories can be maintained locally on the data warehouse server or can be situated on separate computers.

While the invention was described with specificity to XML and SSIS scripts, those skilled in the art will appreciate that a number of other scripting languages can be substituted.

While the functionality provided by the various scripts is divided among three different script types, the same functionality can be provided by a single script, or by a different number of scripts.

Other methods of viewing and modifying the scripts will occur to those skilled in the art.

The individual operational databases can be located on the same server, different servers in the same location, or multiple servers across multiple locations. The physical location of the individual operational databases is not essential to the operation of the present invention. As long as the computer system can access the individual operational databases, the data aggregation operation can proceed. Similarly, the communication between the computer system and the individual operational databases can be wired or wireless, and can pass through proxies (e.g. Internet access), if necessary. Again, as long as communication can take place, the method used is not essential, although some methods can be preferred over others in context, in response to communication speed and bandwidth restrictions.

For some database software products, all the databases in a given product line are organized the same way. In such instances, the computer system may be configured to use a single script for an entire product line.

The OLAP cubes presently used are star schema databases. Other database formats, however, can be implemented based on the nature of the organization and the content and access required for the OLAP cubes. However, star schema data cubes are preferred to enable compatibility with currently known analysis and interface tools, such as Microsoft Excel and ProClarity.

While the computer system has been described with reference to version numbers for the transformation scripts, those skilled in the art will appreciate that the computer system can detect changes to the transformation scripts in a number of ways. For example, the transformer/loader can register the value of a hash function of the transformation script each time it is run and then compare the registered hash function value to the value of the hash function when run on the current transformation script. In this manner, changes in the transformation scripts can be detected with a high degree of certainty. In another example, the transformer/loader can store the entire transformation script as executed last and perform a byte-by-byte comparison to determine if changes have been made.

The above-described embodiments are intended to be examples of the present invention and alterations and modifications may be effected thereto, by those of skill in the art, without departing from the scope of the invention that is defined solely by the claims appended hereto.

What is claimed is:

1. A method for aggregating data from a plurality of operational databases, comprising:
   determining if a transformation script stored in storage of a computer system has been modified;
   upon determining that said transaction script is unmodified, extracting delta data from said operational databases, and automatically merging and transforming said delta data, wherein delta data comprises data that has changed in said operational databases regardless of whether the transformation script has been modified, and wherein said delta data is specified by said transformation script; and,
   upon determining that said transaction script has been modified, extracting all data from said operational databases and automatically merging and transforming said all data, wherein said all data is specified by said transformation script.

2. The method of claim 1, wherein said determining comprises:
   comparing a version number for said transformation script to a registered version number for said transformation script when previously executed.

3. The method of claim 1, wherein said determining comprises:
   comparing the value of a hash function of said transformation script to a registered value of said hash function for said transformation script when previously executed.

4. The method of claim 1, wherein said automatically merging and transforming is performed during a regularly-scheduled update to a data mart.

5. A computer system for aggregating data from a plurality of operational databases, comprising:
   computer-executable instructions stored in storage of said computer system, said computer-executable instructions, when executed by a processor of said computer system:
   determining if a transformation script stored in storage of a computer system has been modified;
   upon determining that said transaction script is unmodified, extracting delta data from said operational databases, and automatically merging and transforming said delta data, wherein delta data comprises data that has changed in said operational databases regardless of whether the transformation script has been modified, and wherein said delta data is specified by said transformation script; and,
   upon determining that said transaction script has been modified, extracting all data from said operational databases and automatically merging and transforming said all data, wherein said all data is specified by said transformation script.

6. The computer system of claim 5, wherein said determining comprises:
   comparing a version number for said transformation script to a registered version number for said transformation script when previously executed.

7. The computer system of claim 5, wherein said determining comprises:
   comparing the value of a hash function of said transformation script to a registered value of said hash function for said transformation script when previously executed.

8. The computer system of claim 5, wherein said automatically merging and transforming is performed during a regularly-scheduled update to a data mart.

9. The method of claim 1, further comprising obtaining, from a data vault log, delta data for each of said operational databases.

10. The method of claim 5, further comprising obtaining, from a data vault log, delta data for each of said operational databases.

* * * * *